(12) United States Patent
Coleman et al.

(10) Patent No.: US 9,888,668 B1
(45) Date of Patent: Feb. 13, 2018

(54) FRESH WATER SUPPLY APPARATUS FOR ANIMALS AND ASSOCIATED USE THEREOF

(71) Applicants: Jerry Coleman, Jackson, MS (US); Robert Griffin, Jackson, MS (US)

(72) Inventors: Jerry Coleman, Jackson, MS (US); Robert Griffin, Jackson, MS (US)

( * ) Notice: Subject to any disclaimer, the term of this patent is extended or adjusted under 35 U.S.C. 154(b) by 620 days.

(21) Appl. No.: 14/019,664

(22) Filed: Sep. 6, 2013

Related U.S. Application Data

(60) Provisional application No. 61/697,520, filed on Sep. 6, 2012.

(51) Int. Cl.
*A01K 7/00* (2006.01)
*A01K 7/02* (2006.01)

(52) U.S. Cl.
CPC ..................................... *A01K 7/02* (2013.01)

(58) Field of Classification Search
CPC ... A01K 7/00; A01K 7/04; A01K 7/02; A01K 39/024; A01K 39/026; A01K 39/02
USPC .................... 119/72, 74, 78, 79, 80
See application file for complete search history.

(56) References Cited

U.S. PATENT DOCUMENTS

| | | | | |
|---|---|---|---|---|
| 1,811,375 A | * | 6/1931 | Wysong | A01K 39/024 119/72.5 |
| 3,306,263 A | * | 2/1967 | Johnson | A01K 7/027 119/73 |
| 4,646,687 A | * | 3/1987 | Peterson | A01K 7/02 119/73 |
| 4,962,730 A | * | 10/1990 | Schafer | A01K 7/04 119/73 |
| 5,782,035 A | * | 7/1998 | Locke | A01G 27/00 47/79 |
| 7,281,494 B1 | * | 10/2007 | Connerley | A01K 7/02 119/74 |
| 2007/0029003 A1 | * | 2/2007 | Reusche | A01K 45/002 141/213 |
| 2008/0190374 A1 | * | 8/2008 | Farris | A01K 7/00 119/74 |
| 2012/0111280 A1 | * | 5/2012 | Shin | A01K 7/025 119/78 |

\* cited by examiner

*Primary Examiner* — Trinh Nguyen

(57) ABSTRACT

A portable fresh water supply apparatus for providing continuous fresh water to an animal when a caregiver is absent includes a reservoir capable of receiving and dispensing fresh water and a water supply line in fluid communication with the reservoir. A shut-off valve is located within the reservoir and is in fluid communication with the water supply line. A water drain line is in fluid communication with the reservoir, and an over-flow drain valve is located exterior of the reservoir as well as in fluid communication with the water drain line. In this manner, when a water level inside the reservoir reaches a threshold level, the shut-off valve is automatically toggled between open and closed positions and thereby selectively supplies fresh water from the water supply line to an interior of the reservoir. The overflow drain line diverts excess water away from the reservoir.

10 Claims, 11 Drawing Sheets

11

FRESH WATER SUPPLY APPARATUS FOR ANIMALS AND ASSOCIATED USE THEREOF

CROSS REFERENCE TO RELATED APPLICATIONS

This application claims the benefit of U.S. Provisional Application No. 61/697,520 filed Sep. 6, 2012, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

Technical Field

Exemplary embodiment(s) of the present disclosure relate to water supply apparatuses and, more particularly, to a portable fresh water supply apparatus for providing continuous fresh water to an animal when a caregiver is absent.

Prior Art

Pet owners who are forced to leave their pets unattended for substantial periods of time have long been interested in providing their pets with watering apparatus which will have ample capacity to satisfy the pet's water requirements. Further, for hygienic reasons it is undesirable to leave a large amount of water standing in a single open reservoir. One preferred means of providing a continuous supply of water over a period of time involves the use of an inverted bottle arranged to deliver its contents of water slowly or as required into a small receptacle.

Further, domesticated animals, especially dogs and cats, often remain home while their owners work are on vacation trips or otherwise not around the animals. For most pet owners, it is important to provide continuous nourishment and water during extended periods of time away from the animal, especially when the animal is left outside during inclement weather conditions.

In many areas where the outside temperature drops well below freezing there is severe danger that animal drinking water supplies will freeze so the animal no longer has access to drinking water. Conversely, when the outside temperature rises above 90 degrees Fahrenheit, for example, the water becomes worm and prone to bacteria growth. This can become very dangerous and many expensive animals can be lost unless the animal handler carefully watches the water supply situation.

Accordingly, a need remains for a portable fresh water supply apparatus in order to overcome at least some of the above-noted shortcomings. The exemplary embodiment(s) satisfy such a need by providing a portable fresh water supply apparatus that is convenient and easy to use, lightweight yet durable in design, versatile in its applications, and designed for providing continuous fresh water to an animal when a caregiver is absent.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a portable fresh water supply apparatus for providing continuous fresh water to an animal when a caregiver is absent. These and other objects, features, and advantages of the non-limiting exemplary embodiment(s) are provided by the portable fresh water supply apparatus including a portable reservoir capable of receiving and dispensing fresh water; a flexible water supply line in fluid communication with the reservoir, a shut-off valve located within the reservoir and being in fluid communication with the water supply line, a water drain line in fluid communication with the reservoir; and an over-flow drain valve located exterior of the reservoir and being in fluid communication with the water drain line. Advantageously, when a water level inside the reservoir rises and falls relative to a threshold level, the shut-off valve is automatically toggled between open and closed positions and thereby selectively supplies fresh water from the water supply line to an interior of the reservoir. In this manner, the overflow drain line diverts excess water away from the reservoir.

In a non-limiting exemplary embodiment, the reservoir includes a bottom surface attached to the shut-off valve and the water drain line, and a staggered upper wall rising upwardly from the bottom surface. Such a staggered upper wall includes a circumferential upper edge extending along a first partial circumference of the staggered upper wall, and a circumferential lower edge extending along a second partial circumference of the staggered upper wall. In this manner, an open top end is formed along a cumulative perimeter of the first partial circumference and the second partial circumference.

In a non-limiting exemplary embodiment, the first partial circumference and the second partial circumference form an entire circumference of the staggered upper wall.

In a non-limiting exemplary embodiment, a lid is removably positioned over and about the first partial circumference and the second partial circumference in such a manner that a gap is formed between the lid and the circumferential lower edge of the reservoir.

In a non-limiting exemplary embodiment, a lower wall extends downwardly from the bottom surface and is contiguously aligned with the staggered upper wall. The bottom surface is raised above a ground level and thereby forms a cavity within a circumferential perimeter of the lower wall. Thus, the water supply line passes through the cavity and is channeled upwardly through the bottom surface.

In a non-limiting exemplary embodiment, the water drain line has a receiving end seated within the reservoir and further has a discharge end located exterior of the reservoir.

In a non-limiting exemplary embodiment, the receiving end of the water drain line terminates at a height substantially equal to a height of the circumferential lower edge of the upper wall.

The present disclosure further includes a method of utilizing a portable fresh water supply apparatus for providing continuous fresh water to an animal when a caregiver is absent. Such a method includes the steps of: providing a portable reservoir capable of receiving and dispensing fresh water; providing and fluidly communicating a flexible water supply line with the reservoir; providing and locating a shut-off valve within the reservoir; fluidly communicating the shut-off valve with the water supply line; providing and fluidly communicating a water drain line with the reservoir; providing and locating an over-flow drain valve exterior of the reservoir; fluidly communicating the over-flow drain valve with the water drain line; when a water level inside the reservoir rises and falls relative to a threshold level, the shut-off valve is automatically toggled between open and closed positions and thereby causes fresh water to be selectively supplied from the water supply line to an interior of the reservoir; and the overflow drain line diverting excess water away from the reservoir.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
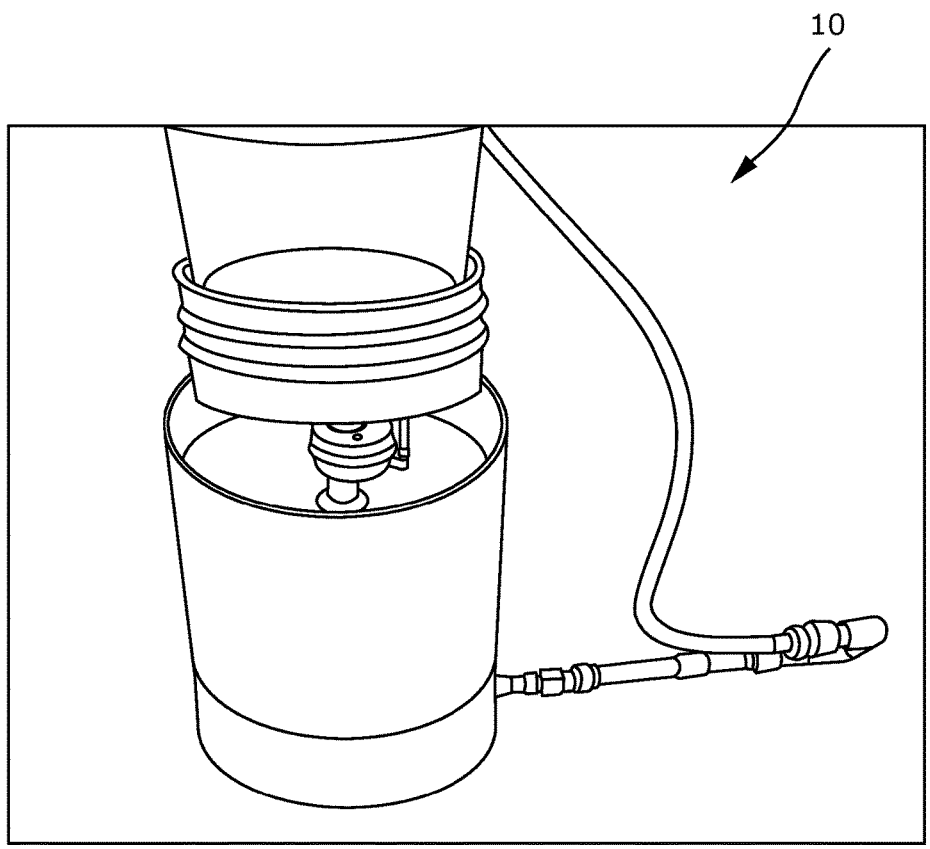
FIG. 1 is a perspective view showing a fresh water supply apparatus for animals, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 2:
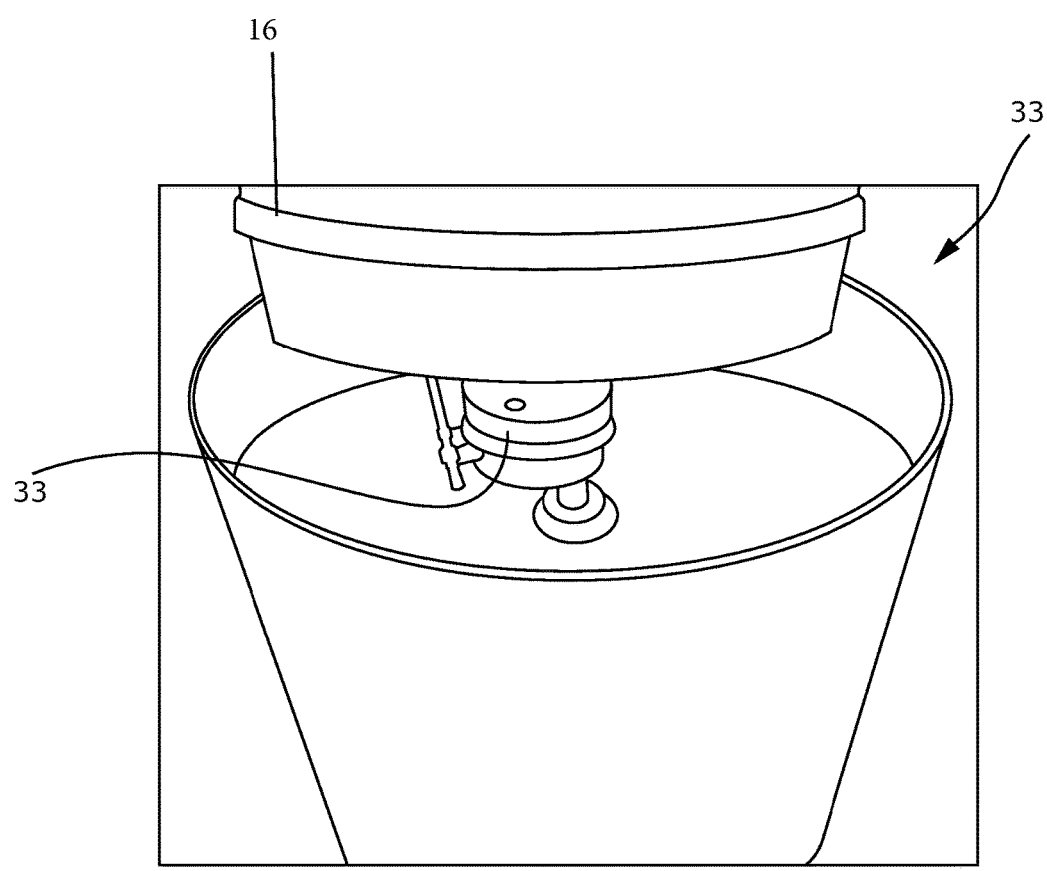
FIG. 2 is an enlarged partial view of the apparatus illustrated in FIG. 1.
Figure 3:
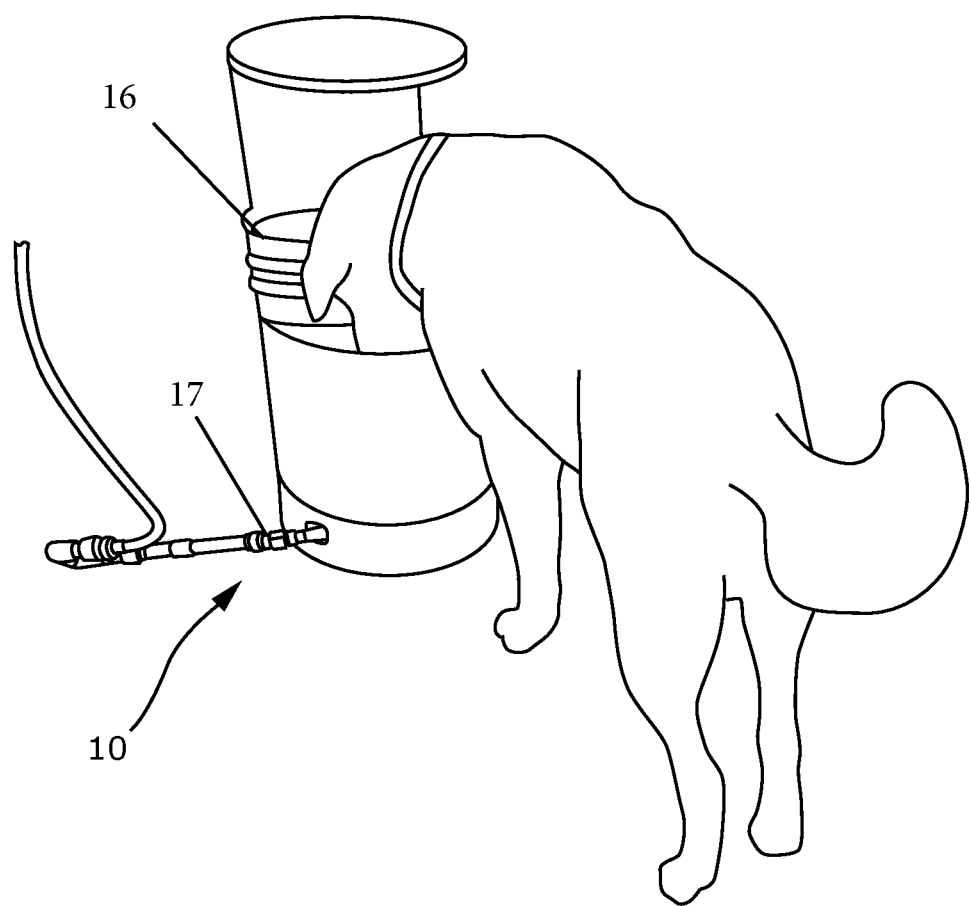
FIG. 3 is a perspective view showing the apparatus used in an exemplary environment.
Figure 4:
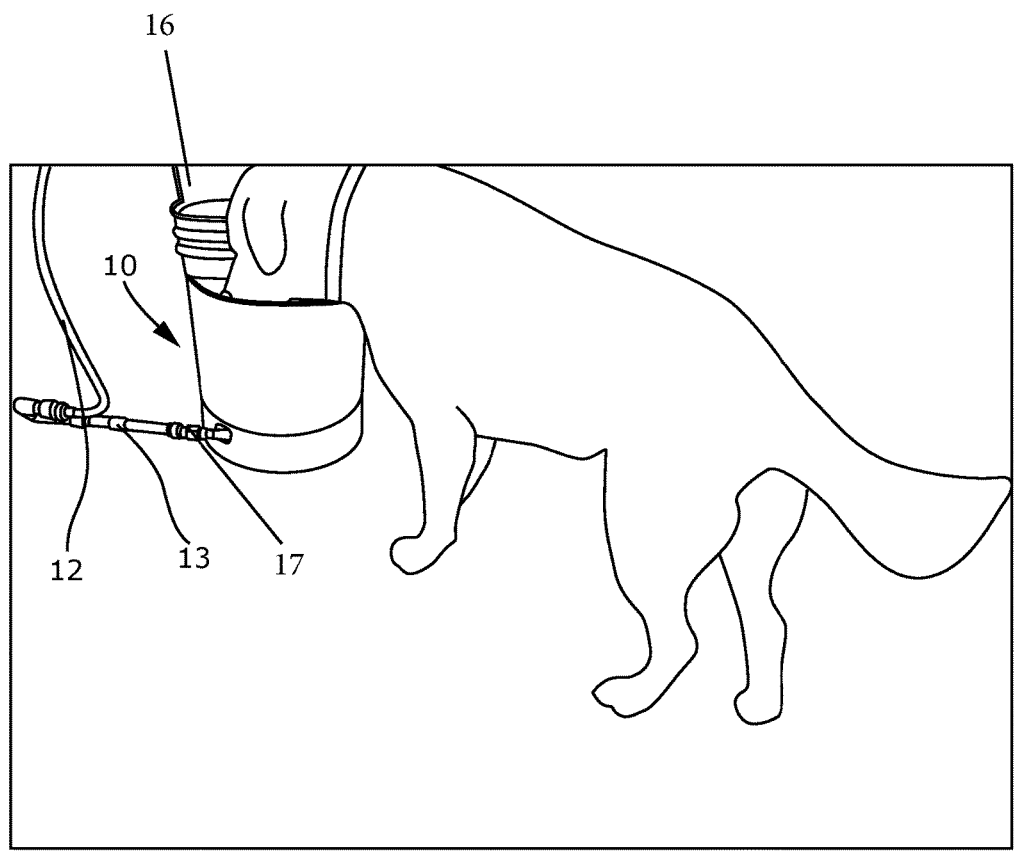
FIG. 4 is a perspective view showing the water supply and drain lines of the apparatus while an animal drinks water from the reservoir.
Figure 5:
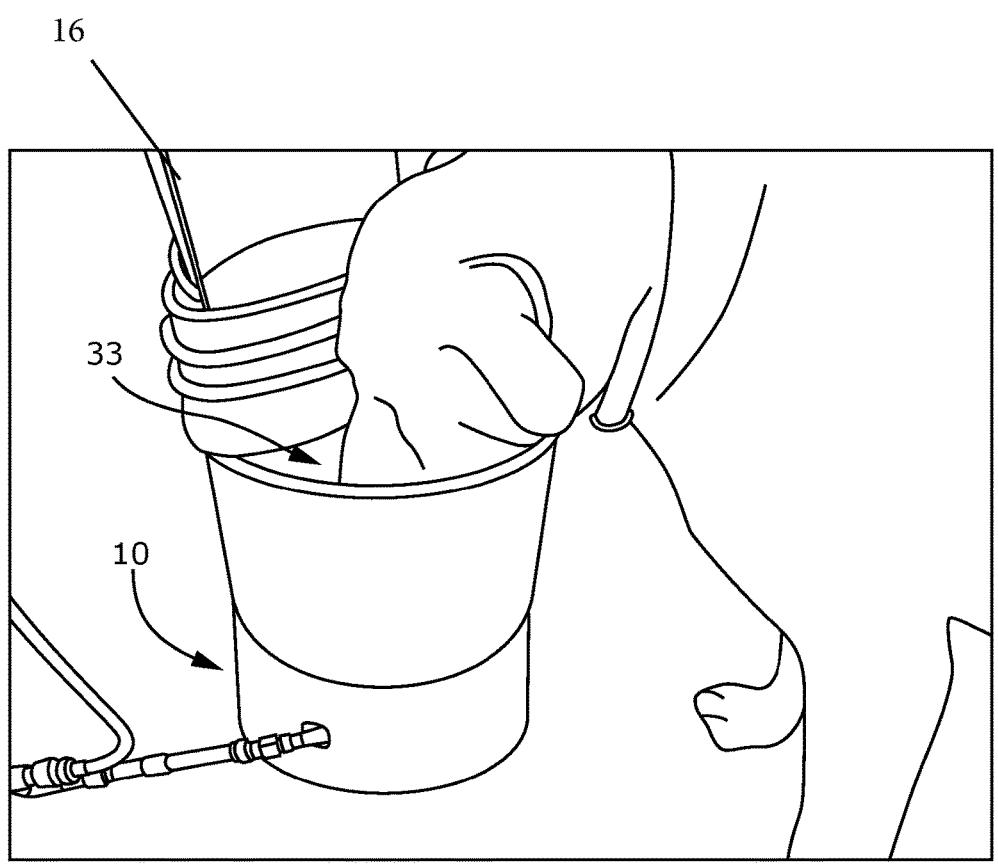
FIG. 5 is a perspective view illustrating a gap formed between the lid and circumferential lower edge of the outer wall.
Figure 6:
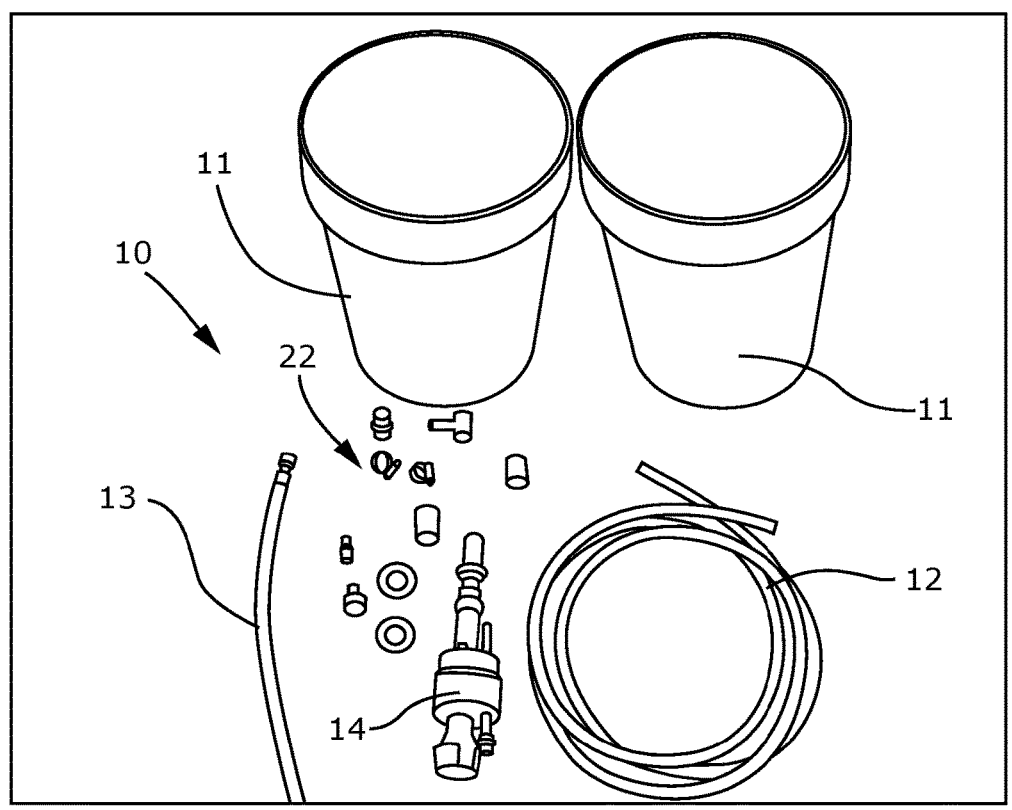
FIG. 6 is an exploded view of the apparatus shown in FIG. 1.
Figure 7:
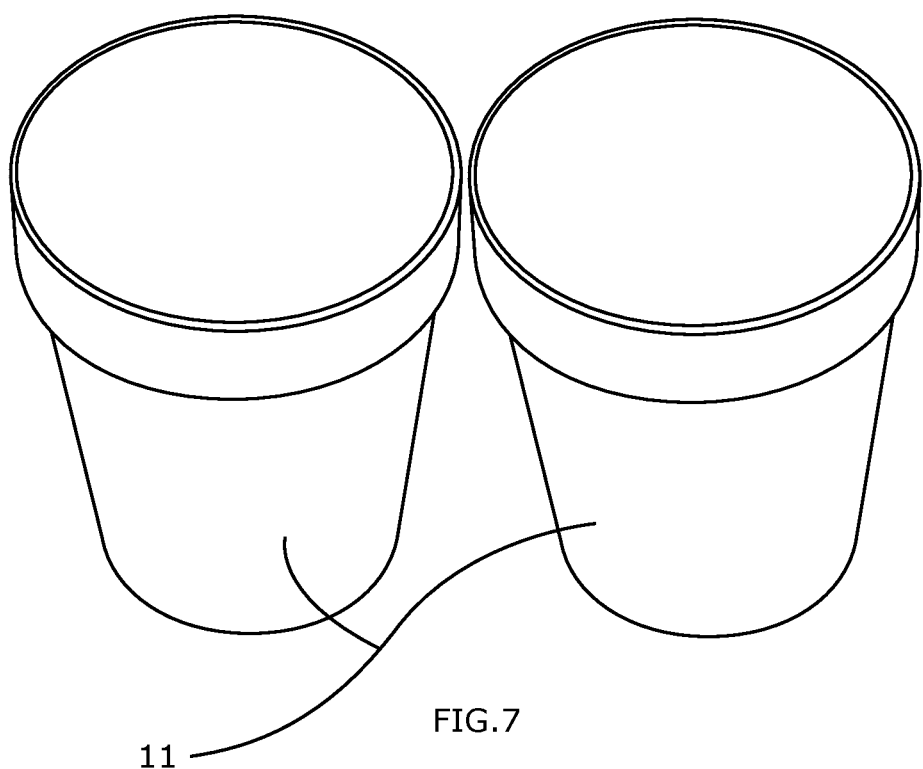
FIG. 7 is a perspective view illustrating exemplary reservoirs used to form the staggered outer wall.
Figure 8:
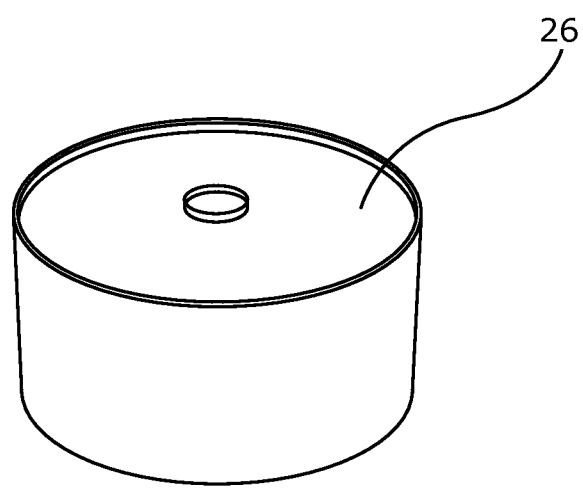
FIG. 8 is a perspective view of an exemplary lid.
Figure 9:
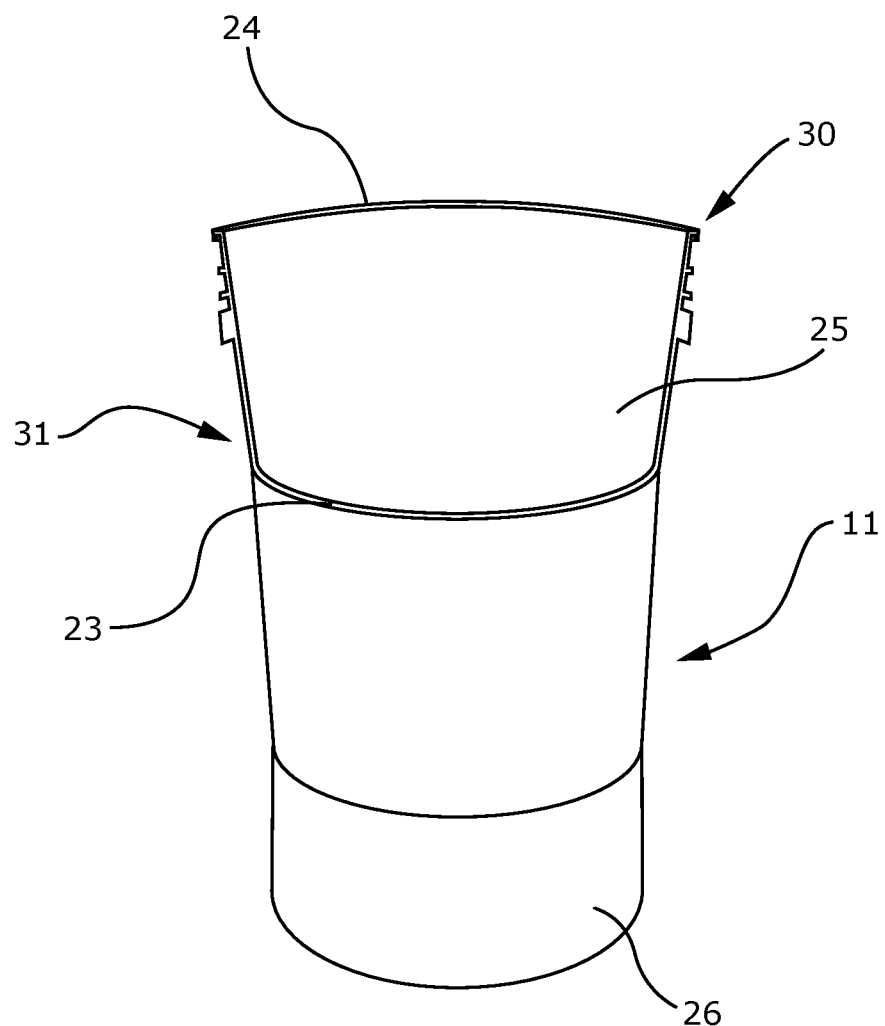
FIG. 9 is a front elevational view showing the circumferential lower and upper edges of the open top end formed at the upper wall.
Figure 10:
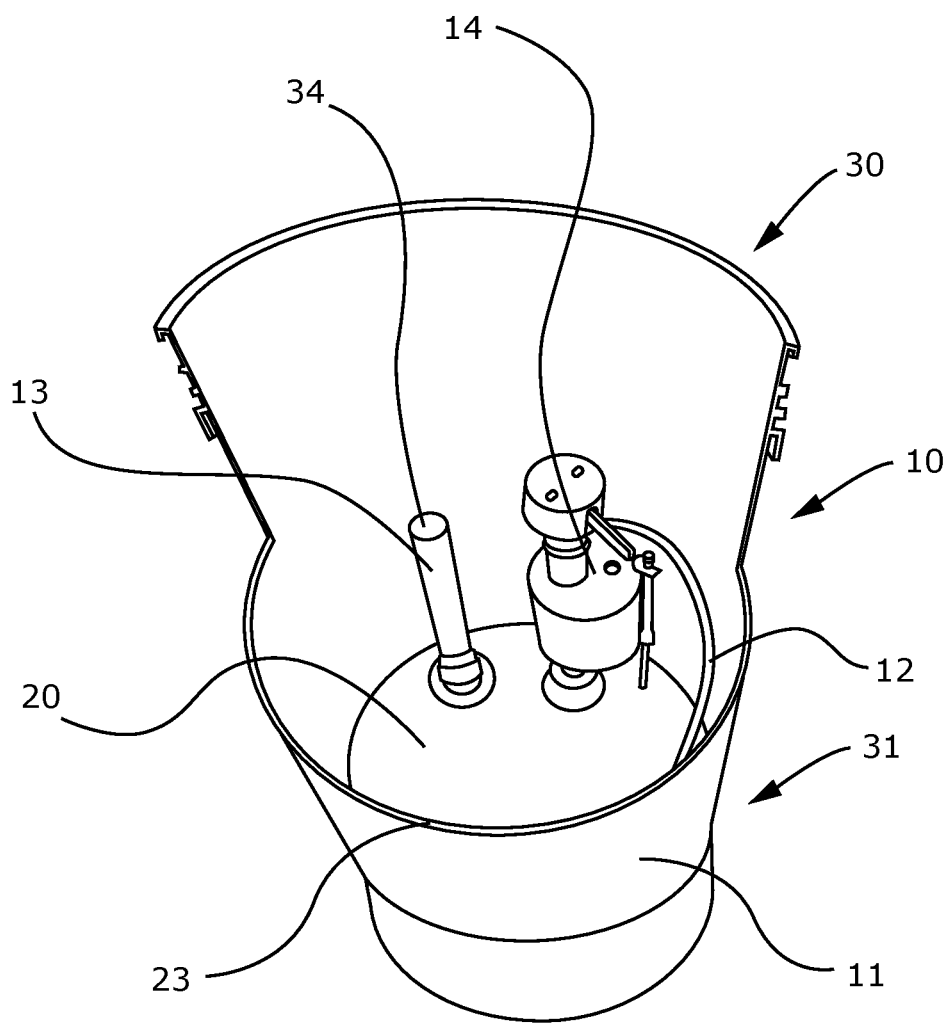
FIG. 10 is a perspective view showing an interior of the reservoir housing the receiving end of the drain line and water shut-off valve.
Figure 11:
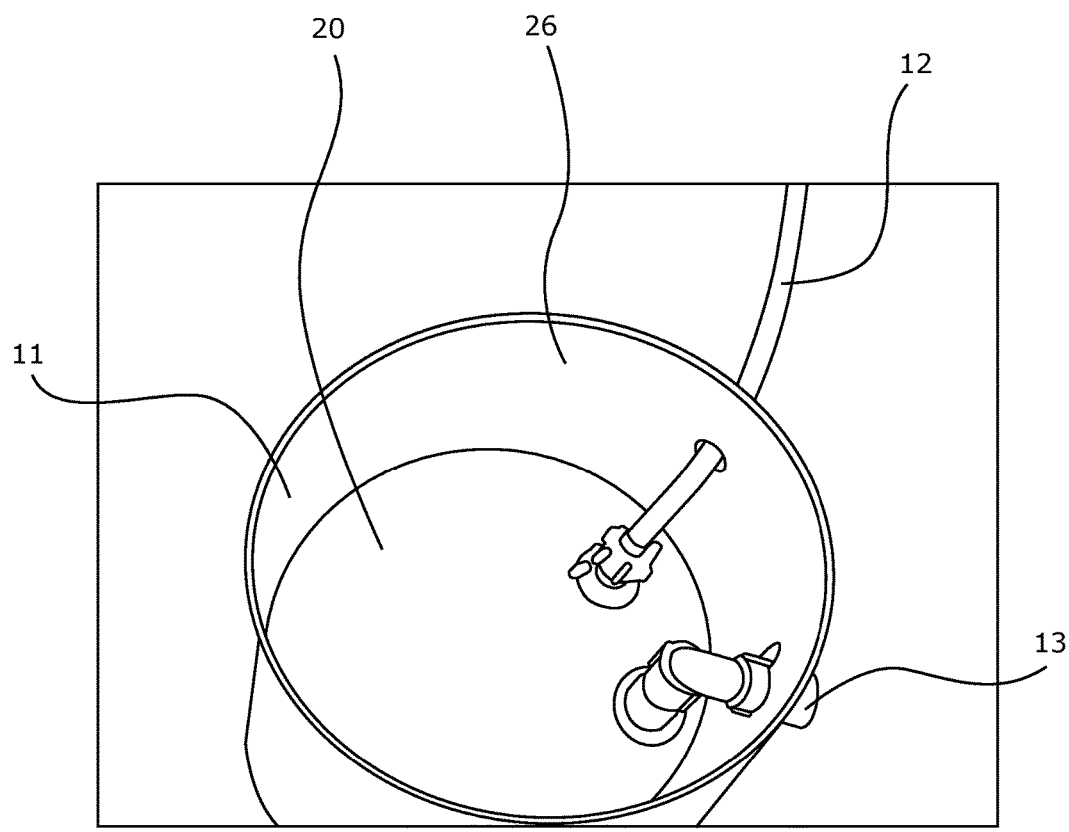
FIG. 11 is a perspective view of the cavity formed within a perimeter of lower wall.

The non-limiting exemplary embodiment(s) is/are referred to generally in FIGS. 1-11 and are intended to provide a portable fresh water supply apparatus 10 (hereinafter referred to as "apparatus") for providing continuous fresh water to an animal when a caregiver is absent, is disclosed. Apparatus 10 includes a reservoir 11 capable of receiving and dispensing fresh water and a water supply line 12 in fluid communication with the reservoir 11. Water supply line 12 may be connected to an external water supply source (e.g., faucet). The reservoir 11 may be suitably sized and shaped for permitting easy access to an interior thereof. The reservoir 11 may have an open top end 35, with a removably lid 16, as needed. In one embodiment, a raised wall may extend upwardly from the open top end 35 to shield the interior of the reservoir 11 from undesirable fluid and debris.

The portable fresh water supply apparatus 10 includes a portable reservoir 11 capable of receiving and dispensing fresh water, a flexible water supply line 12 in fluid communication with the reservoir 11, a shut-off valve 14 located within the reservoir 11 and being in fluid communication with the water supply line 12, a water drain line 13 in fluid communication with the reservoir 11; and an over-flow drain valve 17 located exterior of the reservoir 11 and being in fluid communication with the water drain line 13. Advantageously, when a water level inside the reservoir 11 rises and falls relative to a threshold level, the shut-off valve 14 is automatically toggled between open and closed positions and thereby selectively supplies fresh water from the water supply line 12 to an interior of the reservoir 11. In this manner, the overflow drain line diverts excess water away from the reservoir 11.

In a non-limiting exemplary embodiment, the reservoir 11 includes a bottom surface 20 attached to the shut-off valve 14 and the water drain line 13, and a staggered upper wall 25 rising upwardly from the bottom surface 20. Such a staggered upper wall 25 includes a circumferential upper edge 24 extending along a first partial circumference 30 of the staggered upper wall 25, and a circumferential lower edge 23 extending along a second partial circumference 31 of the staggered upper wall 25. In this manner, an open top end 35 is formed along a cumulative perimeter of the first partial circumference 30 and the second partial circumference 31.

In a non-limiting exemplary embodiment, the first partial circumference 30 and the second partial circumference 31 form an entire circumference of the staggered upper wall 25.

In a non-limiting exemplary embodiment, a lid 16 is removably positioned over and about the first partial circumference 30 and the second partial circumference 31 in such a manner that a gap 33 is formed between the lid 16 and the circumferential lower edge 23 of the reservoir 11. The gap 33 permits the animal to access water contained in the reservoir 11.

In a non-limiting exemplary embodiment, a lower wall 26 extends downwardly from the bottom surface 20 and is contiguously aligned with the staggered upper wall 25. The bottom surface 20 is raised above a ground level and thereby forms a cavity 19 within a circumferential perimeter of the lower wall 26. Thus, the water supply line 12 passes through the cavity 19 and is channeled upwardly through the bottom surface 20.

In a non-limiting exemplary embodiment, the water drain line 13 has a receiving end 34 seated within the reservoir 11 and further has a discharge end located exterior of the reservoir 11.

In a non-limiting exemplary embodiment, the receiving end 34 of the water drain line 13 terminates at a height substantially equal to a height of the circumferential lower edge 23 of the upper wall 25.

The present disclosure further includes a method of utilizing a portable fresh water supply apparatus 10 for providing continuous fresh water to an animal when a caregiver is absent. Such a method includes the steps of: providing a portable reservoir 11 capable of receiving and dispensing fresh water; providing and fluidly communicating a flexible water supply line 12 with the reservoir 11; providing and locating a shut-off valve 14 within the reservoir 11; fluidly communicating the shut-off valve 14 with the water supply line 12; providing and fluidly communicating a water drain line 13 with the reservoir 11; providing and locating an over-flow drain valve 17 exterior of the reservoir 11; fluidly communicating the over-flow drain valve 17 with the water drain line 13; when a water level inside the reservoir 11 rises and falls relative to a threshold level, the shut-off valve 14 is automatically toggled between open and closed positions and thereby causes fresh water to be selectively supplied from the water supply line 12 to an interior of the reservoir 11; and the overflow drain line 13 diverting excess water away from the reservoir 11.

In a non-limiting exemplary embodiment, a bottom surface 20 of the reservoir 11 may be raised above ground level. For example, the outer wall of the reservoir 11 may extend below the bottom surface 20 thereof and thereby define a cavity 19 between the bottom surface 20 and a ground surface on which the reservoir 11 rests. Such a cavity 19 provides a shielded area for connecting the water supply line 12 to the reservoir 11, thereby reducing exposure to foreign objects. The water supply line 12 is preferably formed from flexible material and may be channeled upwardly through the cavity 19 to the bottom surface 20 of the reservoir 11. A conventional fastener may be employed for removably securing the water supply line 12 to the bottom surface 20 of the reservoir 11. A plurality of fasteners 22 are employed to affixed the components to the reservoir, water supply source, etc.

In a non-limiting exemplary embodiment, a shut-off valve 14 is located within the reservoir 11 and is in fluid communication with the water supply line 12. Such a shut-off valve 14 is calibrated to regulate a water level inside the reservoir 11. A float or other suitable element may be attached to the shut-off valve 14 such that the valve regulates entrance of water into the reservoir 11. In should be noted that the external water supply source remains continuously on without the fear to continuously running excess water into the reservoir.

In a non-limiting exemplary embodiment, the shut-off valve 14 may be an automated mechanical, electro-mechanical and/or electric shut-off valve 14 typically used in residential toilets, for example. Sensors may be provided to further detect the water level inside the reservoir.

In a non-limiting exemplary embodiment, a flexible water drain line 13 is in fluid communication with the reservoir 11, and an over-flow drain valve 17 is located exterior of the reservoir 11. The over-flow drain valve 17 is in fluid communication with the water drain line 13. The water drain line 13 may have a receiving end seated within the reservoir 11 and a discharge end located exterior of the reservoir 11. The water drain line 13 preferably exits through the bottom surface 20 of the reservoir 11 and is guided away through cavity 19. The overflow drain line 13 diverts excess water away from the reservoir 11.

Advantageously, when a water level inside the reservoir 11 reaches threshold levels (minimum and maximum water levels), the shut-off valve 14 is automatically toggled between open and closed positions and thereby selectively supplies fresh water from the water supply line 12 to an interior of the reservoir 11.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed is:

1. A portable fresh water supply apparatus for providing continuous fresh water to an animal when a caregiver is absent, said portable fresh water supply apparatus comprising:
    a reservoir capable of receiving and dispensing fresh water;
    a water supply line in fluid communication with said reservoir;
    a shut-off valve located within said reservoir and being in fluid communication with said water supply line;
    a water drain line in fluid communication with said reservoir; and
    an over-flow drain valve located exterior of said reservoir and being in fluid communication with said water drain line;
    wherein, when a water level inside said reservoir rises and falls relative to a threshold level, said shut-off valve is automatically toggled between open and closed positions and thereby selectively supplies fresh water from said water supply line to an interior of said reservoir;
    wherein said reservoir comprises
    a bottom surface attached to said shut-off valve and said water drain line;
    a staggered upper wall rising upwardly from said bottom surface, said staggered upper wall including
        a circumferential upper edge extending along a first partial circumference of said staggered upper wall, and
        a circumferential lower edge extending along a second partial circumference of said staggered upper wall;
    wherein an open top end is formed along a cumulative perimeter of said first partial circumference and said second partial circumference;
    wherein said first partial circumference and said second partial circumference form an entire circumference of said staggered upper wall;
    wherein said reservoir has a smooth and uninterrupted outer perimeter bottom edge continuously circumscribed about said bottom surface.

2. The portable fresh water supply apparatus of claim 1, further comprising: a lid removably positioned over and about said first partial circumference and said second partial circumference in such a manner that a gap is formed between said lid and said circumferential lower edge of said reservoir.

3. The portable fresh water supply apparatus of claim 1, further comprising: a lower wall extending downwardly from said bottom surface and contiguously aligned with said staggered upper wall; said bottom surface being raised above a ground level and thereby forms a cavity within a circumferential perimeter of said lower wall; said water supply line passing through said cavity and being channeled upwardly through said bottom surface.

4. The portable fresh water supply apparatus of claim 1, wherein said water drain line has a receiving end seated within said reservoir and further has a discharge end located exterior of the reservoir.

5. The portable fresh water supply apparatus of claim 4, wherein said receiving end of said water drain line terminates at a height substantially equal to a height of said circumferential lower edge of said upper wall.

6. A portable fresh water supply apparatus for providing continuous fresh water to an animal when a caregiver is absent, said portable fresh water supply apparatus comprising:
    a portable reservoir capable of receiving and dispensing fresh water;
    a flexible water supply line in fluid communication with said reservoir;
    a shut-off valve located within said reservoir and being in fluid communication with said water supply line;
    a water drain line in fluid communication with said reservoir; and
    an over-flow drain valve located exterior of said reservoir and being in fluid communication with said water drain line;
    wherein, when a water level inside said reservoir rises and falls relative to a threshold level, said shut-off valve is automatically toggled between open and closed positions and thereby selectively supplies fresh water from said water supply line to an interior of said reservoir;
    wherein said water drain line diverts excess water away from said reservoir;
    wherein said reservoir comprises a bottom surface attached to said shut-off valve and said water drain line;
    a staggered upper wall rising upwardly from said bottom surface, said staggered upper wall including
        a circumferential upper edge extending along a first partial circumference of said staggered upper wall, and a circumferential lower edge extending along a second partial circumference of said staggered upper wall;

wherein an open top end is formed along a cumulative perimeter of said first partial circumference and said second partial circumference;

wherein said first partial circumference and said second partial circumference form an entire circumference of said staggered upper wall;

wherein said reservoir has a smooth and uninterrupted outer perimeter bottom edge continuously circumscribed about said bottom surface.

7. The portable fresh water supply apparatus of claim 6, further comprising: a lid removably positioned over and about said first partial circumference and said second partial circumference in such a manner that a gap is formed between said lid and said circumferential lower edge of said reservoir.

8. The portable fresh water supply apparatus of claim 6, further comprising: a lower wall extending downwardly from said bottom surface and contiguously aligned with said staggered upper wall; said bottom surface being raised above a ground level and thereby forms a cavity within a circumferential perimeter of said lower wall; said water supply line passing through said cavity and being channeled upwardly through said bottom surface.

9. The portable fresh water supply apparatus of claim 6, wherein said water drain line has a receiving end seated within said reservoir and further has a discharge end located exterior of the reservoir.

10. The portable fresh water supply apparatus of claim 9, wherein said receiving end of said water drain line terminates at a height substantially equal to a height of said circumferential lower edge of said upper wall.

* * * * *